Feb. 13, 1968  W. C. SMITH  3,368,362
FREEZE PROCESS FOR THE SEPARATION OF WATER
Filed April 17, 1964  2 Sheets-Sheet 1

INVENTOR
WILLIAM C. SMITH

BY

ATTORNEY

United States Patent Office 3,368,362
Patented Feb. 13, 1968

3,368,362
FREEZE PROCESS FOR THE SEPARATION
OF WATER
William C. Smith, Green Lake, Wis., assignor, by mesne assignments, to Herbert H. Clark, Jr., Racine, Wis., Jeanne C. Shiras, Gary, Ind., and John P. Briggs, Rocky River, Ohio, the latter as heir of Barbara C. Briggs, deceased
Filed Apr. 17, 1964, Ser. No. 360,576
2 Claims. (Cl. 62—58)

This invention relates to the removal of water from an aqueous liquid, and it more specifically resides in feeding aqueous liquid into a moving stream of cold treating liquid so as to come in direct contact therewith to freeze water from the aqueous liquid into ice, wherein the aqueous liquid moves countercurrently to the direction of flow of the stream of cold treating liquid so as to pass through successively colder regions thereof, after which the ice and aqueous liquid concentrate are separated from the treating liquid and from one another. In another aspect, this invention relates to apparatus suitable for the practice of the foregoing method of removing water from an aqueous liquid.

BACKGROUND

The present invention is intended for the separation of water from a diverse number of aqueous liquids, and the term aqueous liquid is meant to include liquids having materials dissolved, suspended or otherwise mixed with water. Particular usefulness will be found in the treating of spent sulfite liquors which normally constitute paper mill waste, saline waters and brackish waters. Such aqueous liquids have presented problems of water separation which have not been satisfactorily answered to date.

Spent sulfite liquors contain highly complex solids that are difficult to work with but can be of significant commercial value if retrieved economically; further, disposal of sulfite liquor has presented a pollution problem that has been the subject of investigation for many years. It is one of the purposes of the present invention to reduce the water content of sulfite liquor to obtain a solids concentration that will render recovery of the chemicals involved or the use of the concentrate as a fuel economically feasible, thereby enhancing the value of spent sulfite liquor and concurrently providing a solution for the pollution problem.

Saline water conversion, a subject of extensive research, has its major emphasis on recovering desalted water rather than recovering the dissolved materials content, although the latter also can be of commercial importance. Several processes for purifying saline water have been advanced to the demonstration-plant stage and others to commercial plants. Distillation processes, such as single-stage, multiple-effect and vapor compression distillation, have received the principal emphasis. It has been estimated that 95% of demineralized water is produced by some form of distillation and, hence, its developments have advanced to a greater degree than other systems with the result that various designs have been in commercial use throughout the world for a number of years. Other methods of saline water conversion now being developed include electrodialysis, ion exchange, solvent extraction and ultrafiltration.

Another major classification of processes for saline water conversion systems is freezing. The most promising freeze processes thus far developed are generally of the so-called "direct freezing" category in which water is evaporated under reduced pressure or a volatile refrigerant (for example, butane) is vaporized in direct contact with water to produce ice; work has also been done on a hydrate process utilizing freezing. The present invention may be catalogued as a freeze type of process.

A more recent freeze process development, which differs radically from the foregoing types of freeze processes, is disclosed in U.S. Patent No. 3,098,735 to H. H. Clark, wherein a lesser amount of an aqueous liquid is introduced into a stream of cold carrier liquid so that ice is formed from the aqueous liquid. The carrier liquid engulfs and transports the aqueous liquid through a freezing zone so that heat is transferred to the carrier liquid (which has been cooled to an ice-forming temperature) to form ice and aqueous liquid concentrate. The carrier liquid, ice and concentrate all move through the freezing zone in the same direction, and the various constituents are then separated from one another, with the result that water and an aqueous liquid concentrate are obtained, either of which product may be of particular use depending upon the liquid being treated. This process thus differs from other "direct freezing" processes in that cooling is obtained neither by evaporation of precooled water feed nor by evaporation of a volatile refrigerant liquid in a body of water.

THE PRESENT INVENTION

The present invention employs liquid-liquid contact between a cold treating liquid and an aqueous liquid feed undergoing treatment that is somewhat similar to the process of said Patent No. 3,098,735, but from which, nevertheless, substantial departures are made to attain a number of extremely important objectives. Briefly stated, in the present invention, a cold treating liquid passes through a chamber or tower in substantial volume to present a moving stream or body for receipt of the aqueous liquid from which water is to be removed. The aqueous liquid is introduced into the stream of treating liquid from either above or below its liquid level and passes therethrough in a direction of flow counter to the flow of the stream of treating liquid. The aqueous liquid is introduced in such a manner as to promptly subdivide into individual drops within the stream of treating liquid, which drops are preferably on the order of $\frac{1}{16}$ to $\frac{3}{16}$ inch in diameter and are surrounded by the treating liquid to enable the transfer of heat from the aqueous liquid drops to the treating liquid. The temperature of the treating liquid at this point is at or below the freezing temperature of the aqueous liquid so that the temperature of the outer surface of the drops is reduced to form ice from some of the aqueous liquid in each drop. Spheroidal particles are thus formed that comprise ice and aqueous liquid concentrate. As these particles move through the stream of treating liquid, they are subjected to progressively decreasing temperatures so that ice can continue to form from the aqueous liquid concentrate included in each particle, which concentrate has a decreasing freezing temperature due to the removal of water therefrom. The spheroidal particles when separated from the flowing stream of treating liquid are comprised of ice and aqueous liquid concentrate having a final percent solids concentration that is higher than the initial concentration of the aqueous liquid fed into the stream of treating liquid.

Continuous freezing by movement through regions of decreasing temperature can provide hard ice particles and, with maintenance of minimum turbulence within the treating liquid, particles comprised of ice crystals and aqueous liquid concentrate can be developed that are free of the treating liquid and which have a surface hardness that readily sheds the treating liquid; both of these features enable a clean segregation of the spheroidal particles from the treating liquid. Problems of emulsion formation and loss of the treating liquid are eliminated by the ice particle development attained in the process as being presently described.

Various means can be employed to separate the spheroidal particles, comprised of ice crystals and aqueous liquid concentrate, from the treating liquid and, by having them virtually free of the treating liquid they, in turn, can be more readily separated to yield their respective constituents. Also, nearly all the treating liquid can be recooled and recirculated without requiring lengthy dwell periods for separation that might substantially raise the treating liquid temperature and adversely affect process efficiency.

As contrasted to the process described in the Clark Patent No. 3,098,735, the counterflow of the present invention, in which the aqueous liquid feed advances against the flow of the stream of treating liquid, provides a greatly improved freezing action. The freezing developes a superior particle, which forms from a droplet of feed that is immediately established upon the feed entering the cold treating liquid, and which particle contains ice crystals and aqueous liquid concentrate. Once an exterior shell of ice is formed on the particle, the aqueous liquid is removed from direct liquid-liquid contact with the treating liquid. However, freezing of the aqueous liquid concentrate in the particle can continue as it advances against the stream of treating liquid that is decreasing in temperature in the direction of movement of the particle. The resulting particles retain individual integrity and form with hard, well defined outer surfaces, as distinguished from a snow or slush or three phase system as described in the said Clark patent. This facilitates separation of the ice and aqueous liquid concentrate from the treating liquid, since they are both contained in a single particle formed by the freezing action of the present process, and problems of emulsification during separation of ice and concentrate from each other are mitigated since there can be no or very little treating liquid (generally an oily liquid) present when these two products are separated from each other. Separation is also enhanced by the new flow relationship of this process, since there is no need to handle very large quantities of treating liquid in the separation stages of the process. Each of these features is believed to be of vital importance in providing a dewatering process that can be economically superior to other freeze processes for the recovery of water from diverse types of liquid such as saline water, spent sulfite liquor, etc.

OBJECTS AND ADVANTAGES

The present invention has for some of its objects and advantages, the provision of a method for freezing water from an aqueous liquid by feeding the aqueous liquid into a moving stream of treating liquid so that (1) the ice product and concentrated aqueous liquid product can be readily separated from the treating liquid; (2) large-size particles are formed that admit of ready separation of particle constituents by centrifugal apparatus or washing; (3) the aqueous liquid is subjected to progressively decreasing temperatures to permit continued freezing of water from a concentrate whose freezing point is decreasing so as to obtain any selected degree of concentration of the aqueous liquid; (4) there is a minimum amount of treating liquid that leaves the freezing zone along with the particles of ice and concentrate; (5) large-size spheroidal particles are developed that consist of pure ice and aqueous liquid concentrate that lend themselves to separation of the concentrate from the ice after exit from the stream of treating liquid; (6) spheroidal particles are developed that are hard and will retain a minimum amount of treating liquid on their surfaces; (7) the resident time of the aqueous liquid being dewatered or concentrated in the stream of treating liquid can be controlled; (8) a moving stream of cooled treating liquid flows under laminar flow conditions to enhance particle formation and heat transfer conditions; (9) the treating liquid used to remove heat from the aqueous liquid remains in the liquid state throughout the freezing process instead of being vaporized, thereby eliminating complex apparatus that would be required to handle large volumes of vapor, eliminating the need for vessels capable of withstanding high pressure differentials and eliminating the explosive hazards of using gases of the type generally used in such vaporization freezing processes; and (10) operating economies are achieved by utilizing ice product and aqueous liquid concentrate product for cooling purposes such as cooling condensers, etc. Another main object is to provide apparatus suitable for the practice of the herein disclosed process for recovering water from aqueous liquids. These and other objects and advantages will appear in the ensuing description and the preceding list is not intended to be limiting.

In the description and the accompanying drawings which form a part hereof, there is shown by way of illustration a specific process and suitable apparatus for the practice of this invention. These will be described in sufficient detail to enable those skilled in the art to practice the invention, but it is to be understood that other systems and apparatus may be utilized and that structural changes in the items described herein may be made by those skilled in the art without departing from the true scope of the present invention.

(I) Overall description of the process

Figure 1:
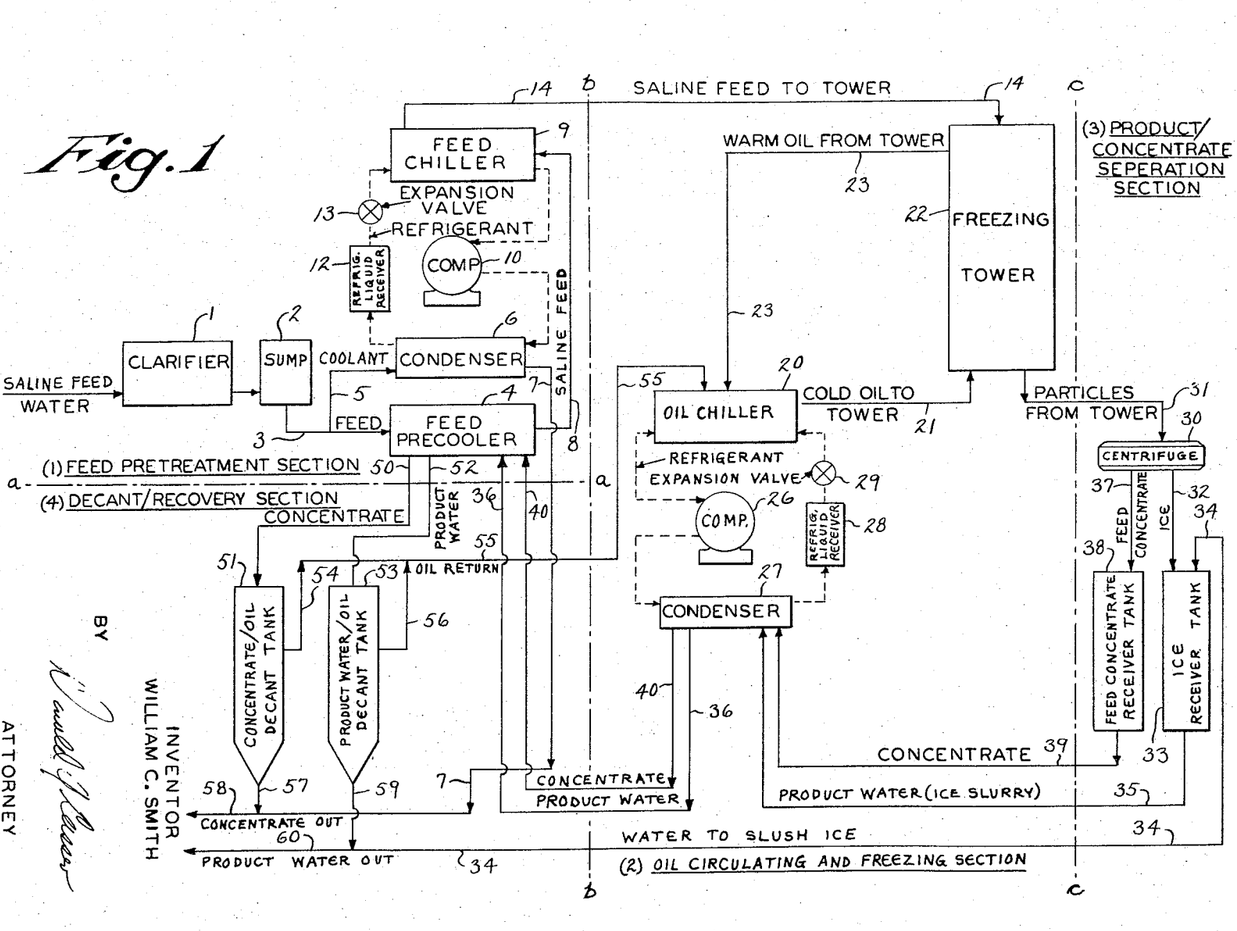
FIG. 1 is a flow sheet illustrating a process suitable for the practice of this invention.

FIG. 1 shows a flow sheet for a process for treating saline water according to this invention. This drawing is diagrammatic and the various apparatus and equipment illustrated therein are not drawn to scale. Valves and pumps have been omitted for the sake of clarity, but the proper arrangement of such items and other equipment not shown as will be necessary to construct a plant in compliance with the flow sheet will be readily apparent to those skilled in the art. The broken lines a—a, b—b, and c—c divide the process into four separate sections to facilitate description, and each section is described below with reference to FIG. 1.

(1) *Feed pre-treatment section.*—Aqueous liquid feed from which water is to be recovered, shown as saline water in FIG. 1, is first pumped into a clarifier 1 wherein silt and skimmings are removed. Clarified saline water is withdrawn from the sump 2 and pumped through line 3 into feed precooler 4; this portion is the feed from which water will be removed. A second stream of clarified saline water is pumped through line 5 into condenser 6 wherein it serves as a coolant stream. (After leaving the condenser 6, the saline water coolant stream flows through line 7 for removal from the system as more fully explained in Part 4 below.) The temperature of the saline feed water when it enters the precooler 4 will depend on the ambient temperature, but for discussion it is usually assumed to be at about 70° F.; in the precooler, it is cooled to as low a temperature as the coolant streams flowing through the precooler will permit so that the maximum cooling capacity is obtained from the coolant streams. The coolant streams for the precooler 4 are described below in Section 4.

The saline feed water leaves the precooler 4 through line 8 and flows through feed chiller 9 wherein it is further cooled to just above its freezing temperature, most desirably, to within about 1° F. to 3° F. of its freezing temperature. The cooling for the feed chiller 9 is furnished by means of a conventional vapor-compression refrigeration system which may use Freon 12 as a refrigerant, that includes a compressor 10, condenser 6, refrigerant liquid receiver 12, and expansion valve 13. In operation, refrigerant liquid is vaporized in the feed chiller 9 to cool the saline feed water, after which the refrigerant vapor is forced by the compressor into the condenser where it is liquified and then returned through the receiver and expansion valve into the feed chiller. The pipe lines for the flow of refrigerant are shown as dashed lines in FIG. 1. Cooled saline feed water leaves the feed chiller 9 through line 14 for transport to the next section of the process.

(2) *Oil circulation and freezing section.*—This section forms the heart of the present process and, in it a treating liquid cooled to an ice-forming temperature is circulated as a moving stream and the saline feed water is injected into the moving stream so that ice is formed from the feed water. In FIG. 1, a water-immiscible saturated hydrocarbon oil is shown as the treating liquid, although other liquids may be used.

The oil is cooled to a selected final ice-forming temperature in oil chiller 20 and pumped through line 21 into the bottom of a freezing tower 22. The oil flows upwardly through the tower as a stream without subdivision into droplets or other small discrete masses; thus, it flows as a continuous body through the tower. Warm oil, i.e. oil whose temperature has been raised through the transfer of heat from the feed (which temperature is but a few degrees less than the temperature of the saline feed to the tower as governed by controlling flow rates) leaves near the top of the tower through line 23 and returns to the oil chiller 20, where it is recooled and recirculated to the tower. It is to be noted that the oil remains in the liquid state throughout the process and is not vaporized in the tower to furnish cooling for the formation of ice.

The cooling for the oil chiller 20 is supplied by a conventional vapor-compression refrigeration system including a compressor 26, condenser 27, refrigerant liquid receiver 28, and expansion valve 29, all connected by suitable pipes shown in dashed lines. The operation of this system is the same as that of the refrigeration system used to cool the feed chiller 9. The cooling streams for the condenser 27 will be described below with reference to Section 3.

Cooled saline feed water is pumped into the top of the freezing tower 22 through line 14 and fed into the upward-moving stream of oil flowing through the tower. The cooled feed can be fed into the moving stream of oil from suitable feed means located above the liquid level of the stream or it can be fed into the moving stream from suitable feed means immersed in the stream itself. In either case, the cooled saline feed water is fed into the moving stream of treating liquid so that it forms drops when it enters the stream. The drops of feed liquid become surrounded by the oil that has been cooled to an ice-forming temperature so that they quickly begin to freeze into spheroidal particles that consist of ice and concentrated feed liquid. That is, the feed concentrate from which water has been removed to form the ice in the particles is contained within the particles. These particles, containing feed concentrate and ice, slowly descend through the upwardly flowing oil stream. The rate of descent of the particles through the stream of treating liquid in the freezing tower is determined principally by the density of the oil used as a treating liquid and the size of the particles. During this freezing process, heat is transferred from the feed liquid to the oil so that the temperature of the oil stream near the top of the tower will be higher than its temperature at the base where it enters the tower. Because the stream of oil is flowing opposite to the direction of movement of the particles formed from the feed liquid, the particles are subjected to decreasing oil temperatures as they progress through the stream so that ice continues to freeze from the feed concentrate contained in each particle.

The descending particles, consisting of ice and feed concentrate, are removed from the moving stream of treating liquid at or near the base of the tower 22. As described more fully hereinafter, one suitable form of separating the solid particles from the oil stream can comprise a moving wire or screen. After being removed from the oil stream, the particles are then fed to the third section of the process to be separated into their constituent materials.

(3) *Product/concentrate separation section.*—The spheroidal particles removed from the moving stream of oil in the freezing tower, as stated previously, comprise ice and feed liquid concentrate. These particles are processed to separate the ice and the concentrate from each other.

In the form shown in FIG. 1, the separation is accomplished by means of a centrifuge 30 which receives the particles from the tower through line 31. It has been discovered that the particles when properly formed will be quite hard and no oil will be trapped within the particles; therefore, the only oil removed with the particles will be that carried on their exterior surfaces which is minimal. This reduces the amount of oil that goes through the centrifuge and precludes the forming of an emulsion therein. The particles can be formed to a very considerable size, with a diameter as large as $\frac{1}{16}''$ to $\frac{3}{16}''$, or even slightly larger, so that they can be readily centrifuged without melting the ice. In the centrifuge, the ice in the spheroidal particles is separated from the feed liquid concentrate in the particles so that ice and concentrate result as products. The ice product leaves the centrifuge 30 through line 32 and is collected in an ice receiver tank 33. A stream of pure water may be added to the ice receiver tank 33 through line 34 in order to slurry the ice so that it may be pumped through the process and used as a coolant stream before being sent to product storage. For this purpose, the product ice, now comprising a pumpable ice slurry, is pumped from the ice receiver tank 33 through line 35 and then through the condenser 27 that is part of the refrigeration section for cooling the treating oil. The condenser 27 is maintained at as low a temperature as possible in order that this refrigeration section can be operated at maximum efficiency. Generally, this will use only part of the cooling capacity of the product ice (or water) stream so that the product water stream is also led through line 36 and through the feed precooler 4 in order to recover its maximum cooling capacity before being sent to decant and storage.

The feed concentrate product liquid leaves the centrifuge 30 through line 37 and is collected in a feed concentrate receiver tank 38 from which it is pumped through line 39 and through condenser 27 to also act as a coolant therein. While passing through the condenser, the product water, and feed concentrate product liquid are kept separate from one another. The concentrate departs from the condenser 27 through line 40 and is fed through feed precooler 4 to also furnish cooling for the feed liquid to be treated. In this manner, both the product ice and the feed concentrate product are circulated through the condenser section of the refrigeration system for cooling the treating liquid and through the heat exchanger for precooling the aqueous liquid feed, before they are sent to decant and product storage, which feature affects important economies in the overall operation of the present process.

(4) *Decant/recovery section.*—After leaving the feed precooler 4, the feed concentrate liquid product and the water product are each led to the final section of the process wherein any residual oil or treating liquid that may be contained in each of these two streams is separated, even though very little oil is carried over in normal operation. For this purpose, the feed concentrate leaves the feed precooler 4 through line 50 and is collected in a concentrate/oil decant tank 51 and the product water leaves feed precooler 4 through line 52 and is collected in a product water/oil decant 53. As was the case with condenser 27, the saline feed, feed concentrate liquid, and product water streams are each kept separate from one another in the feed precooler 4. In decant tank 51, the concentrate is allowed to settle so that oil and liquid concentrate will separate from one another into two distinct phases. Since the oil or treating liquid is to be immiscible with the feed and concentrate, the separation is quite rapid and the oil, being lighter than the concentrate, will settle as an upper layer in the decant tank and the concentrate as the lower layer. This type of separation also takes place in decant tank 53. The oil layer from tank 51 is withdrawn through line 54 into oil return line 55 and the oil layer from the decant tank 53 is withdrawn through line 56 into the return line 55. The decanted oil is pumped through the oil return line 55 into the top of oil chiller 20 so that it may be cooled and recirculated through the freezing tower.

The concentrate is withdrawn from tank 51 through line 57 from which it may be led either to discharge or further treatment if, for example, any chemicals contained in it are to be recovered as may be the case with salt water or sulfite liquor. As indicated in the drawing, line 7 from the condenser 6 may be joined to the line 57 and the saline water used as a coolant stream in the condenser 6 can be mixed with the concentrated liquid from decant tank 51 if that is desired. The saline water coolant stream can have a separate discharge line if it were desired to keep it separate from the concentrate.

The product water is led from its decant tank through line 59 into line 60 from which it may be sent to product storage inasmuch as this is now substantially pure water. In the case of saline water conversion, this stream will constitute the desired product. As indicated in the drawing, some of the product water may be diverted through line 34 for use in forming an ice slurry in receiver tank 33.

Much of the equipment used in the process as described above can be of conventional construction. One of the advantages of the present process is that it may be practiced to a very large extent with conventional equipment instead of resorting to special apparatus such as high pressure vessels or extensive vapor collection systems as is the case with some other types of freeze processes for water recovery. Thus the various chillers, precoolers and condensers are typical heat exchanger units wherein the respective streams, either liquid or gas, are kept separate from one another by intervening heat transfer surfaces. The clarifier can be of known construction and both refrigeration systems are also conventional. Pumps should be added where necessary to achieve the desired flow and valves placed in the required lines to obtain suitable control of the various streams. Many of the lines and vessels should be insulated to prevent undue heat losses.

*Example 1*

Since no attempt has been made to draw FIG. 1 to scale, an appreciation of the sizes of the major pieces of equipment can be had on the basis of design calculations for a plant to produce 50,000 gallons of fresh water per day from sea water. These calculations indicated that the following would be required: freezing tower 22, 10 feet high by 36 square feet cross-sectional area; feed concentrate receiver tank 38 and ice receiver tank 32, each of 300-gallon capacity; and concentrate/oil decant tank and product water/oil decant tank 56, each of 700-gallon capacity. As to the heat transfer surface area for the various heat exchangers, the calculations indicated that the saline feed precooler 4 and saline feed chiller 9 would require a heat transfer surface area of about 970 square feet and 880 square feet respectively; the oil chiller 20 would require about 9,140 square feet; the condenser 27 about 3,200 square feet; and the condenser 6 about 600 square feet of heat transfer area.

For this capacity, the flow rate of saline feed (3.5% solids) to the feed precooler 4 would be 578 lbs./min. and the feed would result in 289 lbs./min. of ice product and 289 lbs./min. of concentrate product (7.0% solids). Oil would flow through the tower at 26,000 lbs./min. to provide the moving stream for producing the ice and concentrate. Other flow rates are: 121.2 lbs./min. for the Freon refrigerant through the feed chiller 9 and condenser 6; 730 lbs./min. for the Freon refrigerant through the oil chiller 20 and condenser 27; and 1,263 lbs./min. for the saline water used as a coolant stream in feed precooler 4. The saline water is assumed to enter the system at 70° F. The heat balance for these flow rates follows, assuming no heat loss from the vessels and pipe lines, allowing for the work done by the compressors in the two refrigeration systems and assuming a 1.5° F. temperature rise of the product streams through the centrifuge.

Heat removed: B.t.u./min.
(1) Cool saline feed from 70° F. to 42.7° F. in feed precooler 4 _________________ 14,847
(2) Cool saline feed from 42.7° F. to 33° F. in feed chiller 9 _________________ 5,270
(3) Freeze feed in tower 22 to form product ice and product concentrate at 25° F. __ 45,706
(4) Cool Freon refrigerant in condenser 6, from 80° F. to 73.2° F. _____________ 5,929
(5) Cool Freon refrigerant in condenser 27, from 42° F. to 39° F. _____________ 47,792
(6) Cool oil in oil chiller 20, from 29° F. to 25° F. _________________________ 45,706

Total _________________________ 165,250

Heat added: B.t.u./min.
(1) To product ice in condenser 27, ice from 26.5° F. to water at 39.2° F. ____ 44,436
(2) To product ice (now water) in feed precooler 4, from 39.2° F. to 66° F. ______ 7,745
(3) To product concentrate in condenser 27, concentrate from 26.5° F. to 39.2° F. 3,356
(4) To product concentrate in feed precooler 4, concentrate from 39.2° F. to 66° F. _________________________ 7,102
(5) To Freon refrigerant in feed chiller 9, vaporize at 30° F. _________________ 5,270
(6) To saline coolant stream in condenser 6, from 70° F. to 75° F. _____________ 5,929
(7) To Freon refrigerant in oil chiller 20, vaporize at 22° F. _________________ 45,706
(8) To oil stream in tower 22 to form ice and concentrate products, oil stream from 25° F. to 29° F. _____________ 45,706

Total _________________________ 165,250

(II) *Detailed description of the freezing tower and freezing action*

Since the freezing action forms the most important part of the present process, a detailed description of the freezing tower and the nature of the freezing action taking place therein will now be given with reference to FIG. 2 which illustrates one form of tower 22 suitable for the practice of the method of this invention.

The freezing tower 22 is shown as a cylindrical vessel having a closed top and open bottom which serves as a treating liquid inlet to the tower. The bottom of the tower is disposed in a vat 70 that has two spaced side walls, a bottom, and two end walls arranged to provide an open top vessel. An inner compartment 71 is formed within the vat 70 by end walls 72 and 73 which extend between the two side walls of the vat 70 (only one side wall is shown in FIG. 2) and by bottom wall 74 which interconnects walls 72 and 73 at their lower ends and also extends between the two side walls of the vat. The open bottom end of the tower 22 is disposed within the inner compartment 71 so that fluid can flow from the inner compartment into the tower through its open bottom.

The treating liquid, herein cold oil, flows through line 21 (from the oil chiller 20, see FIG. 1) and passes through an inlet 75 in the side wall of the vat 70, which inlet communicates with the inner compartment 71. A number of inlets 75 may be appropriately positioned around the vat 70, although only one is shown in the drawing. Near the top of the tower 22, a number of oil outlets 76 are spaced about the perimeter of the side wall of the tower. On the outside of the tower, the oil outlets 76 are surrounded by an annular manifold 77 which communicates with line 23. This construction enables cold oil or other treating liquid to be pumped through line 21 and inlet 75 into the inner compartment 71, from which the oil then flows into the tower 22 through its open bottom and upwardly through the tower to depart therefrom through the exits 76 and manifold 77 ino the line 23 for return to the oil chiller 20, as indicaed in FIG. 1. By this means, a stream of oil can be kept flowing or circulating, as a continuously moving body, through the tower 22 in the direction indicated by the arrows 78 in FIG. 2. To maintain the oil level in the tower, a vacuum pump 79 is attached to a line 80 that communicates with the inside of the top of the tower.

The fluid used as the treating liquid in this process is to be water-immiscible so that it does not dissolve in water or aqueous liquids to any significant or measurable degree and so that water or aqueous liquids will not dissolve in it to any significant or measurable degree. When the water frozen from the aqueous liquid is to be used, the treating liquid should also impart little or no taste or odor to the water. Further, the fluid should be a fully saturated hydrocarbon, i.e. contain no carbon-carbon unsaturation, so that it will not break down as it is being continually recirculated through the tower. Deodorized kerosene; mineral oils, particularly refined petroleum oils consisting essentially of saturated aliphatic and/or naphthenic hydrocarbons; and synthetic liquids such as silicones can be used. A fluid that has proved useful for the treating liquid is the fully refined light hydrocarbon distillate sold under the trade name "Deobase" by the Sonneborn Chemical and Refining Corp. that is predominately aliphatic hydrocarbons with no aromatic or olefin compounds and only a small amount of saturated naphthenes; it is commercially available in food grade quality with minimum odor. The treating liquid should have a low viscosity in order to have good heat transfer characteristics and still have a high enough viscosity to obtain a suitable tower retention time for the particles; both factors must be balanced in choosing an oil.

Saline feed which is precooled to just above its freezing temperature is fed into the top of the tower 22 through line 14 that connects to a feed assembly 81. The feed assembly 81 shown for illustration includes a group of nozzles 82 which feed the aqueous liquid in such manner that it will form into drops in the flowing oil stream. Although the feed means shown here introduces the feed liquid from below the liquid level of the treating liquid in the tower, it is also possible to use a feed means that introduces the feed liquid from above the level of the treating liquid.

An annular shroud 84 surrounds the nozzles in the feed assembly and has a wall that extends a short distance into the oil stream to aid in preventing the ice particles from being swept through the oil outlets 76 as the oil stream flows outwardly through the outlets, and to provide a quiescent pool into which the feed is introduced to facilitate the development of individual drops. As indicated in the drawing, the wall of the shroud 84 extends both above and below the outlets 76. The shroud 84 may be attached to the interior of the tower by means of brackets 95, although it can be held in place by other suitable means.

Whether fed from above or below the level of the moving stream of treating liquid, the aqueous liquid feed is to subdivide into drops when it enters the stream. The feed means must have orifices of a size that will produce drops in the range of from about 1/16" to 3/16" in diameter, and preferably about 3/32" to 5/32" in diameter, when the feed liquid reaches the stream. This size of drop for the feed liquid is important in order to obtain a particle that will not be so small as to freeze too hard nor so large as to prevent heat transfer at a suitably rapid rate.

The drops of feed liquid become surrounded by cooled oil, at or below the freezing temperature of the aqueous liquid feed at its initial concentration. The drops of aqueous liquid will therefore be cooled to their freezing temperature and some of the water in each drop will freeze into ice to form spheroidal particles containing ice and aqueous liquid concentrate. This is accomplished quite rapidly and it is found that each drop begins to freeze from its exterior surface and that the freezing continues inwardly. With this type of particle formation, there is no chance for oil to become trapped inside the spheroidal particles so that each particle is composed essentially of pure ice and residual feed liquid concentrate. The temperature of the oil stream at this point of the freezing zone, designated as $T_1$ in FIG. 2, will be just below the temperature at which the feed liquid begins to freeze when at its initial concentration; preferably, the oil stream temperature is a few degrees below this freezing temperature in order to provide a temperature gradient for heat transfer. If the aqueous liquid was salt water of 3.5% solids or salinity, its initial freezing temperature would be about 28.5° F. and if the aqueous liquid was 10% spent sulfite liquor from paper mill digesters, its initial freezing temperature would be slightly under 31° F. The temperature of the oil when it enters the freezing zone (at the base of the tower) is controlled to a desired temperature by cooling in the oil chiller, as explained below. With a specified quantity of oil entering the tower at a given temperature, one method of controlling the temperature of the oil stream at $T_1$ would be to regulate the amount of feed liquid fed into the oil stream by incorporating a suitable temperature sensor controlling a flow valve.

The specific gravity of the treating liquid in comparison to the specific gravity of the feed liquid and the upward velocity of the treating liquid through the tower are selected so that the spheroidal particles thus formed fall slowly downwardly through the stream of the oil, as indicated by the dashed arrows 85. As the particles move through the upwardly flowing stream of oil, it is desired that ice be continuously formed within each particle until it is ready to leave the tower. In order to achieve this continual freezing action, it is necessary that the oil be at or below the freezing temperature of the feed liquid concentrate that is inside the particles and this is accomplished by cooling the oil stream so that its temperature when it enters the column 22, designated as $T_2$ in FIG. 2, is at or below the freezing temperature of the feed liquid concentrate at its finally desired level of concentration. When the feed liquid enters the oil stream at the top of the tower, it is an initial concentration $C_1$ and has an initial freezing temperature of $T_1$. After entry of the feed liquid into the oil stream, and as ice forms in each drop of feed liquid, the resulting feed concentrate remaining in the spheroidal particles has a higher concentration and a correspondingly lower freezing temperature. When the particles leave the tower 22 through its open bottom, each particle comprises solid ice and liquid feed concentrate that has a final concentration, $C_2$, that is higher than the initial concentration, $C_1$, and a freezing temperature, $T_2$, that is lower than its initial freezing temperature, $T_1$. As the aqueous liquid concentration increases from $C_1$ to $C_2$, there must be a temperature gradient across the oil stream to obtain continued freezing of ice as the concentration of the aqueous liquid in the particles changes and, therefore, the temperature $T_2$ of the oil stream when it enters the base of the tower should be at or just below the temperature that will produce the desired final concentration, $C_2$, of liquid feed. Normally, the oil stream temperature $T_2$ should be several degrees below the freezing point of the aqueous liquid at its final concentration in order to provide a temperature gradient for heat transfer; from 2° to 5° F. gradient is generally satisfactory. By using an oil stream flow in one direction together with a flow of the spheroidal particles through the oil stream in the opposite direction, this invention enables the attainment of continuous freezing as the particles traverse the oil stream and thereby provide economic freeze concentration.

Figures 2, 3:
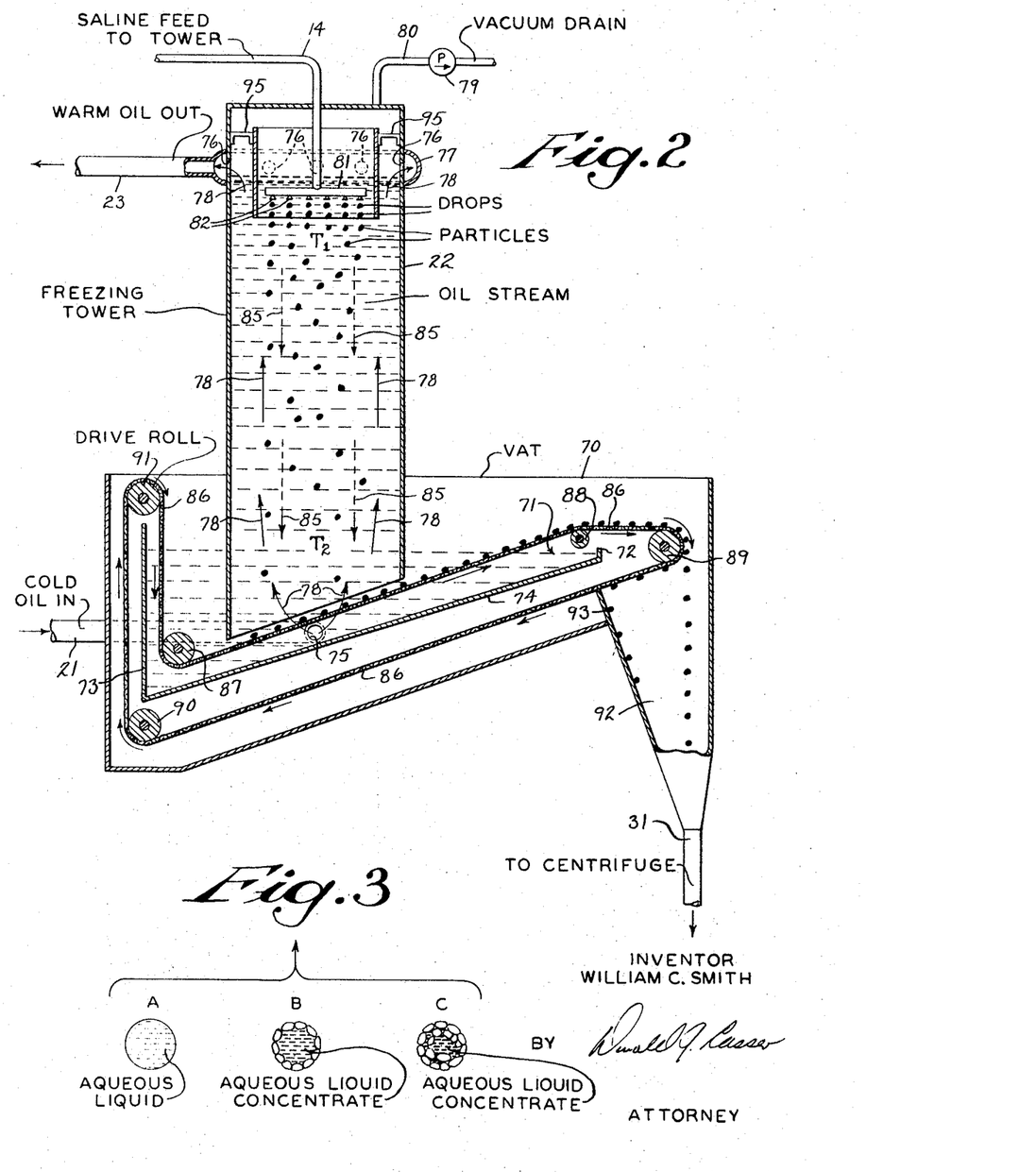
FIG. 2 is a sectional view of one form of freezing tower apparatus suitable for the practice of this invention.
FIG. 3 is a schematic view showing three different stages in the evolution of spheroidal particles containing ice and aqueous liquid concentrate according to the process of this invention.

The particle development in the freezing process of this invention is shown schematically in FIG. 3 which includes three cross-sectional representations of the spheroidal particles at successive stages. When fed into the moving stream of treating liquid, the aqueous liquid subdivides into drops, as indicated at A, that become surrounded by the cold treating liquid. When the exterior of the drop is cooled to its freezing temperature by transfer of heat from the drop to the treating liquid, ice builds up as indicated at B to form a spheroidal particle with aqueous liquid concentrate included within the particle, although the initial ice crystals formed need not necessarily envelop the entire drop before freezing progresses inwardly. Continued movement of the particle through the stream of treating liquid having a decreasing temperature increases the ice content in the particle and yields a particle as shown at C, consisting mostly of ice with some aqueous liquid concentrate. The particle as at C is ready for removal from the stream of treating liquid. In FIG. 2 a number of spheroidal ice-aqueous liquid concentrate particles are shown as small black circles. Because the particles are subjected to decreasing temperature regions as they pass through the stream of treating liquid, they can build up a relatively hard ice surface which will resist absorption of treating liquid. It has been found that there will be essentially no treating liquid trapped within the particles formed in this manner, which means that the separation of the particle into its constituents is made much easier and practical; this also has the important and beneficial effect of enabling the bulk of the oil to remain in its circulating stream without going through the separation steps of the process, thereby greatly lessening undesired temperature increases in the oil stream and lending important economies to the process. The particles can attain a substantial size, on the order of $\frac{1}{16}$ to $\frac{3}{16}$ inch in diameter, with the process of this invention that is of material aid to effective separation by centrifugal and other means; this is in contrast to some other freezing processes which form a very small particle that unduly melts when centrifuged. The particle formation in the process of this invention is believed to be unique in that it enhances heat transfer, assists separation by keeping the feed concentrate in the particle instead of in the oil stream, assists separation by keeping the treating oil away from the interior of the particle, and results in a comparatively large particle that can be readily separated into its ice and aqueous liquid concentrate constituents.

It should be stressed that the particles formed by the process of this invention are not exactly as pictured, since the drawings are only intended as diagrammatic for the purposes of illustration. The particles may not be perfect spheres, although many of them normally are, but they may also have other shapes, rounded or almost rounded, and regular as well as irregular; thus, the term "spheroidal particle" as may be used herein and in the claims is used in a broad sense and is meant to refer to any generally three-dimensional or rounded particle whether or not spherical, as distinguished from other types of particles such as very thin flat discs, flakes, or tiny ice crystals, etc. The particles appear to be very smooth when freshly formed and to have a thin outer shell of ice; sometimes the outer shell may partially melt to give the particle a somewhat "dimpled" exterior. The ice crystals in the particles may appear in a variety of shapes; some have a rectangular cross section and others hexagonal, with each form occurring in a variety of ways in the particle, generally as needle or acicular crystals. The ice crystals can also be oriented in a variety of arrangements in the particle; some crystals are arranged in a fairly regular lamellar structure, others seem to radiate outwardly from the center of the particles, still other particles have the ice crystals arranged in several directions, and in some the ice crystals are arranged in curved layers. The color of the particles will vary depending on the type of aqueous liquid being treated. When spent sulfite liquor was used as the aqueous feed, the ice itself contained in each particle appeared to be perfectly clear and water white and the concentrated aqueous liquid in the particles had a dark brown color; the residual dark brown aqueous liquid concentrate in the particles appeared to be in the interstices between the ice crystals.

The quantity of treating liquid flowing through the tower per unit time is substantially greater than the amount of aqueous liquid fed into the stream of treating liquid per unit time. The heat abstracted from the aqueous liquid in forming ice and aqueous liquid concentrate is to be absorbed by the treating liquid as the treating liquid flows through the freezing zone. The amount of heat required to be removed (per unit of time) from the aqueous liquid in being, first, cooled from its entry temperature to the freezing temperature at its initial concentration, $T_1$, and, second, the heat required to be removed from the aqueous liquid in forming ice at temperatures between $T_1$ and the freezing temperature $T_2$ of the aqueous liquid at its final concentration when leaving the freezing zone is to be absorbed by the stream of treating liquid as the stream temperature increases from $T_2$ to $T_1$. With these heat transfer requirements ascertained, the quantity of treating liquid can be determined using its specific heat and its temperature change. After the quantity of treating liquid necessary for the heat removal has been thusly determined, the velocity of the treating liquid stream can be computed for a tower of a given cross sectional area.

The stream of treating liquid as it flows through the tower is to have laminar or streamline flow in order to obtain the desired particle formation and inhibit agglomeration of individual particles. Its velocity can be varied widely as long as it is within the laminar flow range and does not exceed the critical velocity of the tower so as to produce turbulent flow. Critical velocity as used herein is defined as the average linear velocity above which a particular fluid, at a given temperature and pressure, will move in turbulent flow and below which the flow is laminar or streamline. Thus the critical velocity of a particular system is the maximum limiting velocity or flow rate of the stream of treating oil which should not be exceeded in order to obtain the results desired for this invention. The critical velocity for any particular system can be calculated by accepted fluid dynamics methods, based upon the size and shape of the tower and the density and viscosity of the treating liquid. As is typical in fluid flow computations, tests may have to be run with a particular system to determine the various constants necessary for the computations, but this will be apparent to those skilled in the art. As indicated in the above paragraph, the specific oil velocity for a particular application is dependent on the amount of heat that must be withdrawn from the feed liquid and the temperature rise of the oil stream in absorbing this heat. With a particular tower of a given cross-sectional area, the specific oil velocity calculated as indicated above should be within the laminar flow range for the tower.

Some of the control of the amount of water removed from the feed liquid by freezing in the tower is achieved by regulating the time the particles are retained in the freezing zone of the oil stream within the tower. This freezing zone retention time must be sufficient to accomplish the heat transfer needed to achieve the desired degree of water removal from the aqueous feed. The principal factors affecting retention time are the viscosity of the treating liquid and particle size, with an increase in the viscosity increasing the retention time and an increase in the particle size increasing the retention time. The difference in the specific gravity between the feed liquid and the treating liquid, the height of the freezing zone, and the velocity of the oil stream in the tower also affect retention time. An increase in the specific gravity difference between the treating liquid and the feed liquid and an increase in the height of the freezing zone will both increase retention time. In general, the specific gravity of the oil or other treating liquid should be at least about 10% less than the specific gravity of the feed liquid, and there is preferably even a greater difference. As far as the degree of water removal from the feed is concerned, present information indicates that removal of about 50% water from saline water feed is optimum from an economic standpoint, and that to achieve a higher percentage of water removal from the feed, additional freezing stages would be preferable. Where sulfite liquor is the feed, and it is desired to produce a burnable concentrate, the sulfite liquor should be concentrated to about 50% solids; this means that about 89% of the water must be removed from the sulfite liquor feed at an initial concentration of 10% solids. Experience to date has indicated that about 91.5% of the water can be removed from 10% sulfite liquor by the freezing process of this invention. The amount of water to be taken from a particular aqueous liquid feed depends upon the nature of the liquid, the nature of the concentrate that is desired to be produced from the liquid and the economic operation of the process.

After the speroidal particles have been in the freezing zone long enough to consist of ice and aqueous liquid concentrate at the finally-desired concentration, the particles are removed from the stream of oil. For this purpose, in the embodiment illustrated, there is provided a moving wire screen in the vat 70 that is arranged to catch the particles leaving the open bottom of the tower 22 and carry them out of the oil for transport to the separation portion of the process. A moving wire belt 86 is shown in FIG. 2 as being draped about guide rollers 87, 88, 89 and 90, and drive roller 91 so that its upper reach travels through the inner compartment 71 beneath the open bottom of the tower 22 and its lower reach travels outside the inner compartment. The drive roller 91 is driven by a suitable motor and driving mechanism not shown in the drawings and each of the rollers is appropriately journaled in the side walls of the vat 70 with suitable end bearings as may be required. The wire moves in the direction indicated by the arrows positioned about the wire and rollers so that its movement through the inner compartment 71 is from left to right in FIG. 2. The mesh of the wire is such that the particles from the tower are caught on the wire and carried upwardly out of the oil stream in the inner compartment. A wire belt such as that used on Fourdrinier paper-making machines is suitable for this purpose. It is important to realize that the wire belt does not divide the stream of oil into droplets or small discrete masses so that the stream's character as a moving continuous body of treating liquid is preserved. Draining of oil from the exterior of the particles is achieved as the wire moves the particles above the level of oil in the inner compartment. The particles formed by the freezing action of this invention have a relatively hard exterior surface that resists absorption of the oil, as compared to a soft mushy surface that would absorb oil, such as would occur if the particles were passing through oil stream regions of increasing temperatures. Thus, oil that is carried out of the tower will be on the outer surface of the particles and relatively easy to remove.

When the moving wire passes over the guide roller 89, the particles drop from the wire into a hopper 92 formed as part of the vat 70. The particles then pass through line 31 into the centrifuge 30 for separation into ice and aqueous liquid concentrate. As indicated in the drawing, one wall defining the hopper can extend to just underneath the moving wire 86 in order to catch solid particles that may stick to the wire to prevent them from returning to the oil stream, although relatively few particles stick to the wire in this fashion.

It has been found that the particles containing ice and liquid concentrate formed in the freeze process of this invention lend themselves to ready separation from the oil stream and also to ready separation into their respective constituents. The particles are of a sufficiently large size, many being as large as ⅛-inch in diameter and some even slightly larger, so there is no undue melting of the ice as the particles are carried out of the oil stream and transported into the separation section, nor is there any substantial loss of ice by melting in the centrifuge where centrifugation is used as a separatory means. Other freeze processes, in contrast, generally produce very small ice particles on the order of about ½-mm., or less, in diameter up to about 1½-mm. in diameter. Ice crystals of this small size sometimes cannot be centrifuged or are very difficult to centrifuge and are also difficult to transport when being removed from the cooling area since they melt very readily. Any melting of ice either when the particles are removed from the freezing zone or freezing area or when being separated into ice and feed concentrate results in a loss of efficiency in the overall process. Therefore, it is important that a freeze process provide large-size ice particles so as to eliminate, as much as possible, efficiency loss from this source. As indicated previously, the oil carried into the separation section is a minimum amount of treating liquid that adheres to the outer surface of the particles. There is such little oil carry-over with the process of this invention that there is less than 2 to 4% oil with the particles and, therefore, no problem of emulsification in the centrifuge. The particles can be washed with pure water, if desired, either after they have been removed from the oil stream or while in the centrifuge or other separation apparatus, or at both stages, to remove treating liquid from their surfaces. The ice contained in the particles is generally of a high degree of purity inasmuch as the salts and other materials dissolved or suspended in the aqueous feed liquid accumulate in the aqueous feed concentrate rather than in the ice.

This invention provides a flowing stream of treating liquid cooled to a suitable temperature into which aqueous liquid is fed in a manner that is in the form of drops when in the stream. Heat is transferred from the drops surrounded by the cooled treating liquid, to freeze some of the water in each drop into ice. This develops a particle consisting essentially of ice and aqueous liquid concentrate, which particle moves through the stream of treating liquid in a direction opposite to stream flow. By reason of this physical relationship between the feed and treating liquid, it is possible to produce a particle wherein none of the treating liquid is trapped inside the particle. The portion of the moving stream traversed by the aqueous feed in its movement therethrough and in which freezing action takes place is designated as a freezing zone. By reason of the new counter-current flow of the stream of treating liquid, in relation to the flow of the aqueous liquid introduced into the stream, the temperature of the treating liquid at its exit from the freezing zone is higher than its temperature at its entrance into the zone, to thereby have the aqueous liquid feed be subject to progressively decreasing temperatures as it moves through the freezing zone. This enables freezing of aqueous liquid concentrate in the particles to continue as the particles pass through the freezing zone, and thereby increases the amount of water of the aqueous liquid that can be removed and frozen into ice, which is an important feature for providing an economical freeze process. The stream of treating liquid is recooled after its exit from the freezing zone and then recirculated through the zone for treatment of additional feed. The treating liquid remains in the liquid state throughout this process and undergoes no change of state by evaporation, as is the case with refrigerant liquids used in a number of other prior art freezing processes.

The freezing action of the process of this invention provides an improved particle which includes ice and aqueous liquid concentrate from which water has been frozen into ice. This is in distinction to other freeze processes which provide an ice crystal, or ice particle that is surrounded by aqueous liquid concentrate which is in contact with the cooling medium. With this invention, the separation of ice and aqueous liquid concentrate from the treating liquid is facilitated inasmuch as the concentrate is removed from liquid-liquid contact with the treating liquid by the particular particle formation of the present invention. As the particles are formed from the drops of aqueous liquid feed, the ice in the particles separates the aqueous liquid concentrate in the particles from direct contact with the treating liquid. At the same time, the particles are such that they can be readily separated into their ice product and aqueous liquid concentrate product constituents. Separation is further enhanced by the fact that the separation apparatus does not have to handle large quantities of the treating liquid, since the treating liquid does not go through the separation steps. The only treating liquid to go through the separation is that which is carried over on the surface of the particles; this is a minimal amount, and can be on the order of as low as a few percent, and in most instances, less than 5%. This minimal treating liquid carry-over greatly reduces the possibilities of forming emulsions in separating the products from one another by centrifuging and also reduces the temperature increase in the treating liquid that would occur if it were necessary for the treating liquid to go through the separation portions of the process. In general, the retention time for the particles in the stream of treating liquid can vary over a wide range, although freezing zone retention times of from about 20 seconds to 2 minutes have been found normally sufficient to produce the desired degree of water removal from the aqueous liquid feed.

To obtain further important economies, the ice product and aqueous liquid concentrate product streams are both utilized as coolant streams in various apparatus of the process to as great an extent as possible. In this respect, it has been found that new economy results are obtained by utilizing these two streams as coolants in the condenser section of the refrigeration system for cooling the treating liquid to a desired ice-forming temperature and then utilizing any cooling capacity remaining in these two streams to precool the aqueous liquid feed as it enters the apparatus.

Further important results are obtained by utilizing two refrigeration systems, a first refrigeration system for cooling the treating liquid to an ice forming temperature and a second refrigeration system for cooling aqueous liquid feed to a temperature just a few degrees above its initial freezing temperature. In this connection, it has been found that important economies are achieved by utilizing the aqueous liquid at its ambient temperature, defined as its average temperature when entering the freezing process of this invention, as the coolant stream in the condenser section of the second refrigeration unit.

A suitable form of apparatus for practicing the present invention, particularly as to the freezing tower portion thereof, has also been described. The described apparatus can be varied in many features and other suitable forms of apparatus can be used to practice the process of the invention. A number of suitable tower designs besides that specifically shown herein can be utilized and more than one tower unit can be used in a given installation, with each arranged in parallel to provide a multiple-cell apparatus or with each arranged in series to provide a multiple-stage apparatus. In addition, other arrangements of the various functional apparatus with respect to the tower or other freezing vessel can be made. Although centrifuges have been illustrated herein as a suitable separating means, other separating apparatus can be incorporated with the freezing process of this invention.

It is to be understood that it is intended to cover all changes and modifications of the example of this invention herein chosen for the purpose of illustration which do not constitute a departure from the true spirit and scope of this invention.

I claim:

1. The method of removing water from an aqueous liquid containing dissolved solids wherein the liquid at an initial concentration is treated to form ice and aqueous liquid concentrate at a final concentration that is higher than the initial concentration, comprising the steps of:
   (1) flowing a stream of treating liquid through a freezing zone as a continuous body, said treating liquid being immiscible with the aqueous liquid and said stream having laminar flow through the freezing zone;
   (2) cooling said stream of treating liquid so that its temperature when entering the freezing zone is about equal to the freezing temperature of the aqueous liquid at its final concentration;
   (3) cooling aqueous liquid to about one to three degrees above its freezing temperature at its initial concentration;
   (4) feeding the cooled aqueous liquid into the flowing stream of treating liquid near the position at which the stream of treating liquid departs from the freezing zone so that the aqueous liquid is in the form of drops when in the stream and the drops become surrounded by treating liquid to freeze water from the drops into ice and form particles that contain ice and aqueous liquid concentrate, which particles move through the stream of treating liquid in a direction opposite to the flow of the stream through the freezing zone and freezing of ice from the aqueous liquid concentrate in the particles continues as they move through the freezing zone;
   (5) removing said spheroidal particles from the stream of treating liquid after the particles have been in the stream long enough to freeze sufficient water from the aqueous liquid concentrate in the particles to raise said concentrate to the final concentration,
   (6) separating the particles into ice product and aqueous liquid concentrate product after the particles have been removed from the stream of treating liquid,
   (7) cooling the aqueous liquid to about one to three degrees above its freezing temperature at its initial concentration prior to its entry into the freezing zone by first passing it through a heat exchanger,
   (8) passing the separated ice product through the heat exchanger as a first coolant stream,
   (9) passing the separated aqueous liquid concentrate product through the heat exchanger as a second coolant stream; and
   (10) then passing the thusly cooled aqueous liquid through the evaporator section of a refrigeration system.

2. The method of removing water from an aqueous liquid containing dissolved solids wherein the liquid at an initial concentration is treated to form ice and aqueous liquid concentrate at a final concentration that is higher than the initial concentration, comprising the steps of:
   (1) flowing a stream of treating liquid through a freezing zone as a continuous body, said treating liquid being immiscible with the aqueous liquid and said stream having laminar flow through the freezing zone;
   (2) cooling said stream of treating liquid by passing it through the evaporator section of a first refrigeration system including a first condenser section so that its temperature when entering the freezing zone is about equal to the freezing temperature of the aqueous liquid at its final concentration;

(3) cooling aqueous liquid to about one to three degrees above its freezing temperature at its initial concentration;

(4) feeding the cooled aqueous liquid into the flowing stream of treating liquid near the position at which the stream of treating liquid departs from the freezing zone so that the aqueous liquid is in the form of drops when in the stream and the drops become surrounded by treating liquid to freeze water from the drops into ice and form particles that contain ice and aqueous liquid concentrate, which particles move through the stream of treating liquid in a direction opposite to the flow of the stream through the freezing zone and freezing of ice from the aqueous liquid concentrate in the particles continues as they move through the freezing zone;

(5) removing said spheroidal particles from the stream of treating liquid after the particles have been in the stream long enough to freeze sufficient water from the aqueous liquid concentrate in the particles to raise said concentrate to the final concentration, (6) separating the particles into ice product and aqueous liquid concentrate product after the particles have been removed from the stream of treating liquid, (7) cooling the aqueous liquid from its ambient temperature to a few degrees above its freezing temperature at its initial concentration by first passing the liquid through a heat exchanger, (8) passing the separated ice product through the heat exchanger as a first coolant stream after it leaves the said first condenser section, (9) passing the separated aqueous liquid concentrate product through the heat exchanger as a second coolant stream after it leaves the said first condenser section, (10) then passing the thusly cooled aqueous liquid through the evaporator section of a second refrigeration system including a second condenser section, and (11) passing aqueous liquid at its ambient temperature through said second condenser section as a coolant stream.

References Cited

UNITED STATES PATENTS

| | | | |
|---|---|---|---|
| 2,666,304 | 1/1954 | Ahrel | 62—58 |
| 2,764,488 | 9/1956 | Slattery. | |
| 3,098,733 | 7/1963 | Rosenstein | 62—58 |
| 3,098,735 | 7/1963 | Clark | 62—58 |
| 3,178,899 | 4/1965 | Torobin | 62—58 |
| 3,180,102 | 4/1965 | Torobin | 62—58 |

FOREIGN PATENTS 70,507   7/1946   Norway.

NORMAN YUDKOFF, *Primary Examiner.*